(12) United States Patent
Guo et al.

(10) Patent No.: US 11,488,293 B1
(45) Date of Patent: Nov. 1, 2022

(54) METHOD FOR PROCESSING IMAGES AND ELECTRONIC DEVICE

(71) Applicant: BEIJING DAJIA INTERNET INFORMATION TECHNOLOGY CO., LTD., Beijing (CN)

(72) Inventors: Sainan Guo, Beijing (CN); Di Yang, Beijing (CN)

(73) Assignee: BEIJING DAJIA INTERNET INFORMATION TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/568,156

(22) Filed: Jan. 4, 2022

(30) Foreign Application Priority Data

Apr. 30, 2021 (CN) .......................... 202110480567.3

(51) Int. Cl.
| | |
|---|---|
| G06T 5/50 | (2006.01) |
| G06T 5/00 | (2006.01) |
| G06T 11/00 | (2006.01) |
| G06T 7/73 | (2017.01) |
| G06T 5/20 | (2006.01) |
| G06T 15/04 | (2011.01) |

(52) U.S. Cl.
CPC .............. *G06T 5/50* (2013.01); *G06T 5/002* (2013.01); *G06T 5/20* (2013.01); *G06T 7/73* (2017.01); *G06T 11/001* (2013.01); *G06T 15/04* (2013.01); *G06T 2207/20221* (2013.01); *G06T 2207/30201* (2013.01)

(58) Field of Classification Search
CPC .. G06T 5/50; G06T 5/002; G06T 5/20; G06T 7/73; G06T 11/001; G06T 15/04; G06T 2207/20221; G06T 2207/30201
See application file for complete search history.

(56) References Cited

U.S. PATENT DOCUMENTS

| | | | |
|---|---|---|---|
| 10,152,778 B2* | 12/2018 | Chen | ........................ G06T 5/20 |
| 2008/0267443 A1 | 10/2008 | Aarabi | |
| 2011/0115786 A1 | 5/2011 | Mochizuki | |
| 2020/0058153 A1* | 2/2020 | Ouyang | .............. G06V 40/166 |

FOREIGN PATENT DOCUMENTS

| | | |
|---|---|---|
| CN | 107492079 A | 12/2017 |
| CN | 107945135 A | 4/2018 |

(Continued)

OTHER PUBLICATIONS

Extended European Search Report Communication Pursuant to Rule 62 EPC, dated Jul. 11, 2022 in Patent Application No. EP 22150514.2, which is a foreign counterpart application to which this application claims priority.

(Continued)

*Primary Examiner* — Phuoc Tran
(74) *Attorney, Agent, or Firm* — Kolitch Romano LLP

(57) ABSTRACT

A method for processing images is provided. The method includes: acquiring a first image by smoothing a skin region of a target object in an original image; determining a skin texture material matching with a face area of the target object; acquiring a facial texture image of the target object by rendering the skin texture material; and acquiring a second image by fusing the facial texture image with the first image.

19 Claims, 4 Drawing Sheets

(56) References Cited

FOREIGN PATENT DOCUMENTS

| | | |
|---|---|---|
| CN | 110717867 A | 1/2020 |
| CN | 112884637 A | 6/2021 |

OTHER PUBLICATIONS

Liang, Lingyu, et al.; "Content-Aware Face Blending by Label Propagation", Advances in Databases and Information Systems, [Lecture Notes in Computer Science; Lecture Notes Computer], Springer International Publishing, Cham, pp. 173-182, Nov. 3, 2018, sections 2 and 3.

Wang, Hong Yong, et al.; "A Method of Generating Global View Texture Images In 3D Face Modeling", Information Science and Engineering, 2010 2nd International Conference on, IEEE, Piscataway, NJ, USA, pp. 3435-3438, Dec. 4, 2010, Section III.

\* cited by examiner

METHOD FOR PROCESSING IMAGES AND ELECTRONIC DEVICE

This disclosure is based on and claims priority to Chinese Patent Application No. 202110480567.3, filed on Apr. 30, 2021, the disclosures of which is herein incorporated by reference in its entireties.

TECHNICAL FIELD

The present disclosure relates to the field of computer technologies, and in particular, relates to a method for processing images and an electronic device.

BACKGROUND

With the development of computer technologies and the diversification of terminal functions, a user can use a terminal to take selfies (namely, take his/her own portrait photos). After the selfies are taken, skin grinding can be performed on an acquired image to remove blemishes or facial defects on a face in the image. In an ordinary face skin grinding and beautifying algorithm, the smoothness and uniformity of a face are improved by performing high-intensity low-pass filtering on the face, thereby achieving the skin grinding effect.

SUMMARY

The present disclosure provides a method for processing images and an electronic device. The technical solutions of the present disclosure are as follows.

According to an aspect of embodiments of the present disclosure, a method for processing images is provided. The method includes: acquiring a first image by smoothing a skin region of a target object in an original image; determining a skin texture material matching with a face area of the target object; acquiring a facial texture image of the target object by rendering the skin texture material, wherein both facial key point information and facial posture information of the facial texture image are matched with the target object; and acquiring a second image by fusing the facial texture image with the first image.

According to yet another aspect of embodiments of the present disclosure, an electronic device is provided. The electronic device includes: one or more processors; and one or more memories configured to store one or more instructions executable by the one or more processors, wherein the one or more processors, when loading and executing the one or more instructions, are caused to perform the following processes: acquiring a first image by smoothing a skin region of a target object in an original image; determining a skin texture material matching with a face area of the target object; acquiring a facial texture image of the target object by rendering the skin texture material, wherein both facial key point information and facial posture information of the facial texture image are matched with the target object; and acquiring a second image by fusing the facial texture image with the first image.

According to yet another aspect of embodiments of the present disclosure, a non-transitory computer-readable storage medium is provided. The storage medium stores one or more instructions therein, wherein the one or more instructions, when loaded and executed by one or more processors of an electronic device, causes the electronic device to perform the following processes: acquiring a first image by smoothing a skin region of a target object in an original image; determining a skin texture material matching with a face area of the target object; acquiring a facial texture image of the target object by rendering the skin texture material, wherein both facial key point information and facial posture information of the facial texture image are matched with the target object; and acquiring a second image by fusing the facial texture image with the first image.

DETAILED DESCRIPTION

Figure 1:
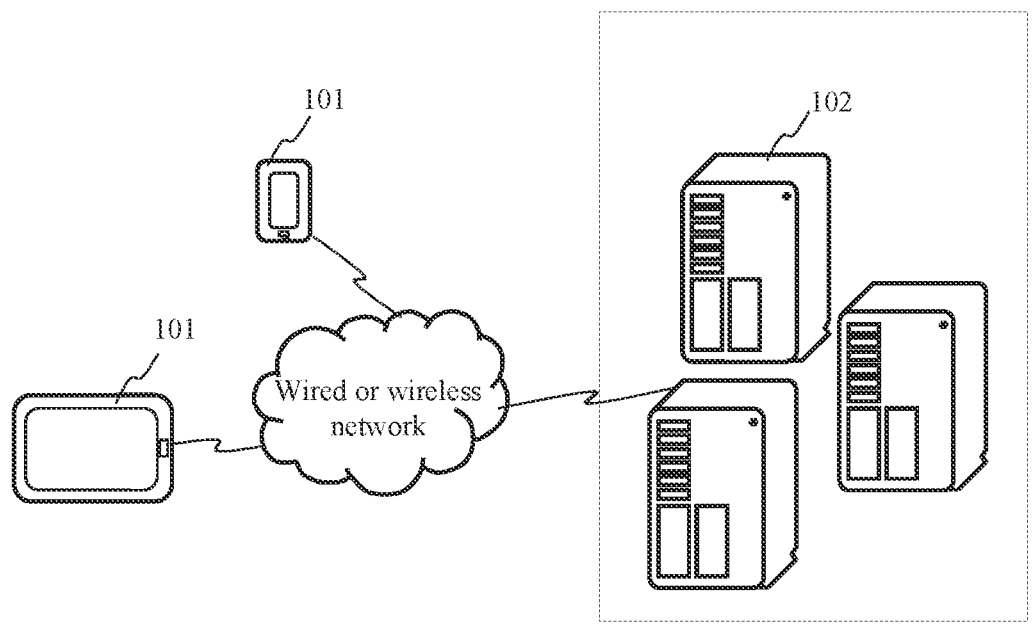
FIG. 1 is a schematic diagram of an implementation environment of a method for processing images according to an embodiment.

Terms "first," "second," and the like in the description and claims, as well as the above-mentioned accompanying drawings, of the present disclosure are used to distinguish similar objects, but not necessarily used to describe a specific order or precedence order. It should be understood that data used in this way are interchangeable where appropriate, such that the embodiments of the present disclosure described herein can be implemented in a sequence other than those illustrated or described herein.

User information in the present disclosure is authorized by a user or fully authorized by all parties.

The following describes terms involved in the embodiments of the present disclosure.

Smoothing: "Smoothing operation" and "smoothing" involved in the embodiments of the present disclosure refers to a smoothing operation performed on an image, that is, modifying pixel values of some pixels (for example, pixels in a skin region) in a to-be-processed image, to make the image smoother and more continuous, or reducing or deleting noise points (or outliers) in the image. Smoothing is a process of low-pass filtering, by which a wide area, a low-frequency component, and the main part of an image are highlighted, and noise and a high-frequency interference component of the image are suppressed, such that the brightness of the image can change gradually, the sharp gradient can be reduced, and the quality of the image can be improved. However, edges of the image are usually blurred. A smoothing method includes, but is not limited to, a Gaussian blur method, a neighborhood averaging method (average filtering method), an overrun pixel smoothing method, a bilateral filtering method, a median filtering method, and surface blur.

Gaussian blur: Gaussian blur, as an image smoothing technology, is also referred to as Gaussian smoothing and is usually used to reduce image noise and detail level. The visual effect of the image smoothed by Gaussian blur technology is like observing the image through ground glass, which is obviously different from the bokeh effect of out-of-focus imaging of a lens and the effect of an image acquired in a general lighting shadow. Gaussian smoothing is also used in the pre-processing stage of a computer vision algorithm to enhance the effects of images with different proportions. From a mathematical point of view, the Gaussian blur process for an image is a convolution of the image and normal distribution. Because the normal distribution is also referred to as Gaussian distribution, this technology is called Gaussian blur. Blurring the image with the Gaussian blur technology produces a more accurate bokeh effect. Because the Fourier transform of a Gaussian function includes another Gaussian function, Gaussian blur is equivalent to a low-pass filter for an image.

Facial posture information: Facial posture information is configured to indicate a face rotation condition of a target object. In other words, the facial posture information is configured to describe angle information of a face orientation of the target object. Facial posture information is generally represented in four forms: rotation matrix, rotation vector, quaternion, and Euler angle (the four parameters can also be converted to each other). The Euler angle is also referred to as an Euler angle of the facial posture and includes three angles, that is, pitch angle, yaw angle, and roll angle. The pitch angle indicates an angle by which a face rotates around an x-axis, and can be visually described as an angle of nodding a head; the yaw angle indicates an angle by which a face rotates around a y-axis, and can be visually described as an angle of shaking a head; and the roll angle indicates an angle by which a face rotates around a z-axis, and can be visually described as an angle of tilting/swinging a head. The embodiments of the present disclosure are mainly involved in the yaw angle in the Euler angle.

Feather: A principle of feathering is to blur the connection part between the inside and the outside of a selected region (namely, the skin region), to achieve gradation and the effect of natural connection. "Feathering" in the embodiments of the present disclosure indicates a process, performed after skin grinding for the skin region using a smoothing method, for achieving an effect of natural connection on a transition part between the skin region and a non-skin region.

Scale: A scale space of a signal refers to a set of low-frequency signals acquired by filtering an original signal via a series of single-parameter Gaussian filters with increasing widths, while the scale space of an image refers to a set of low-frequency signals acquired by replacing the foregoing original signal with image data. When analyzing an unknown scene using a machine vision system, a computer cannot know the scale of an object in the image in advance and needs to consider the description of the image at multiple scales to know the best scale of an object of interest. Usually, a series of image sets with different scales are constructed for the image, to detect features of interest at different scales. For example, when detecting a face based on a Harr feature, a computer does not know the size of a face in an image. Therefore, it is necessary to generate an image pyramid composed of a series of images of different sizes, and scan each of the images to find a possible face. An image can be efficiently expressed at multiple scales by pyramiding the image. The general processes of pyramiding the image include: first, the image is smoothed via a low-pass filter; and then, the smoothed image is sampled (generally, the sampling proportion is ½ in both horizontal and vertical directions), to acquire a series of reduced images. The term "scale" involved in the embodiments of the present disclosure refers to a scale of texture material in the scale space. In other words, "scale" specifically refers to the resolution of the texture material.

Resolution: "Resolution" involved in the embodiments of the present disclosure refers to image resolution, namely, the amount of information stored in an image, specifically, the number of pixels per inch of the image. The unit of resolution is pixels per inch (PPI). The image resolution is configured to indicate the definition of an image. The greater the resolution, the higher the definition of the image; and the smaller the resolution, the lower the definition of the image.

In the related art, a user can use a terminal to take selfies (namely, take his/her own portrait photos). After the selfies are taken, skin grinding can be performed on an acquired image to remove blemishes or facial defects on a human face in the image. In an ordinary face skin grinding and beautifying algorithm, the smoothness and uniformity of a face are improved by performing high-intensity low-pass filtering on the face, thereby achieving the skin grinding effect. However, this may also directly cause a loss of face skin texture, which makes the sense of unreal face stronger.

Based on the above, by performing some sharpening operations after the skin grinding, part of high-frequency information can be added back to the image acquired after the skin grinding, to improve the reality of portrait beautification. However, a large amount of image noises are introduced in the case of directly performing these sharpening operations, which weakens the effect of removing the blemishes or facial defects.

For example, unsharp masking (USM) is a commonly used sharpening algorithm, whose main idea is to acquire a high-frequency signal based on the difference between an original image and a low-frequency signal, and then superimpose the high-frequency signal on the original image based on a specific weight coefficient. Because the USM sharpening algorithm causes an obvious edge effect, it is prone to increase image noise. In addition, in the case of inappropriate parameter adjustment, facial blemishes that have been removed by skin grinding are added back, resulting in low accuracy and poor effect of image processing. In addition, the high-frequency information is acquired based on a low-frequency signal, and all parameters required for calculating the low-frequency signal need to be finely adjusted, such that the overall sharpening process is cumbersome and complicated.

In view of this, the embodiments of the present disclosure provide a method for processing images, which can provide a supplement, by superimposing a facial texture image, for facial texture detail information lost during a skin grinding operation, thereby reducing the sense of unreal face caused by loss of facial texture using a traditional skin grinding method. That is, the method of the present disclosure can make the images going through portrait beautification look more real. In addition, fine processing can be further performed to a face region by locking the face region in the original image without affecting other non-face regions (such as a background region, a hair region, a hand region, and the like); and a smooth transition can be achieved between the face region and non-face regions, thereby achieving a more natural and harmonious processing effect for the beautifying of portrait.

It should be noted that the target object involved in the embodiments of the present disclosure includes but is not limited to a character, an animal, a cartoon character, a virtual character, a virtual object, or the like. The type of the target object is not specifically limited in the embodiments of the present disclosure.

FIG. 1 is a schematic diagram of an implementation environment of a method for processing images according to an embodiment. Referring to FIG. 1, the implementation environment includes a terminal 101 and a server 102. Each of the terminal 101 and the server 102 is an electronic device. The following provides detailed descriptions.

The terminal 101 is any electronic device supporting image processing, on which an application for processing images is installed. For example, the application includes at least one of a retouching application, a photo-taking application, a short video application, a live-streaming application, or a social application. Execution code used for processing images is embedded in the application. In this way, in response to a user inputting an original image containing a target object into the application, the following processes are performed based on the execution code: Smoothing is performed on the skin region of the target object; after the skin grinding effect is achieved, skin texture details of the target object are added, based on a pre-stored skin texture material, to a first image acquired by grinding the skin. Therefore, the sense of the unreal face caused by the skin grinding operation is weakened, and the reality/authenticity of portrait beautification is improved.

The terminal 101 and the server 102 is connected with each other via a wired or wireless network.

The server 102 is an electronic device configured to provide background services for the above application. The server 102 includes at least one of one server, a plurality of servers, a cloud computing platform, or a virtual center. Optionally, the server 102 is responsible for the primary work of image processing, and the terminal 101 is responsible for the secondary work of image processing; or the server 102 is responsible for the secondary work of image processing, and the terminal 101 is responsible for the primary work of image processing; or a distributed computing architecture is used between the terminal 101 and the server 102 to perform the image processing collaboratively.

In some embodiments, the terminal 101 performs the method for processing images independently, which can reduce the computing load of the server 102 and avoid occupying processing resources of the server 102 during image processing.

In some embodiments, the terminal 101 cooperates with the server 102 to perform the method for processing images via information interaction between the terminal 101 and the server 102. In other words, after acquiring the original image, the terminal 101 sends a skin grinding and beautifying instruction containing the original image to the server 102 in response to a trigger operation of a user for a skin grinding functional option. In response to the skin grinding and beautifying instruction, the server 102 acquires a second image by smoothing the original image and then superimposing a skin texture material on the smoothed image, and finally sends the second image to the terminal 101. In this case, some image processing work can be migrated to the server 102, thereby maintaining relatively high system performance of the terminal.

In some embodiments, the terminal 101 refers to one of a plurality of terminals. A device type of the terminal 101 may be, but not limited to, at least one of a vehicle terminal, a television, a smart phone, a smart speaker, a tablet computer, an e-book reader, a Moving Picture Experts Group Audio Layer III (MP3) player, a Moving Picture Experts Group Audio Layer IV (MP4) player, a laptop portable computer, or a desktop computer. The following embodiments are described by using an example in which the terminal includes a smart phone.

Those skilled in the art can know that a quantity of the terminals 101 can be greater or less. For example, there is only one, or are tens of, hundreds of, or a greater quantity of the terminals 101. The quantity and device type of the terminals 101 are not limited in the embodiments of the present disclosure.

Figure 2:
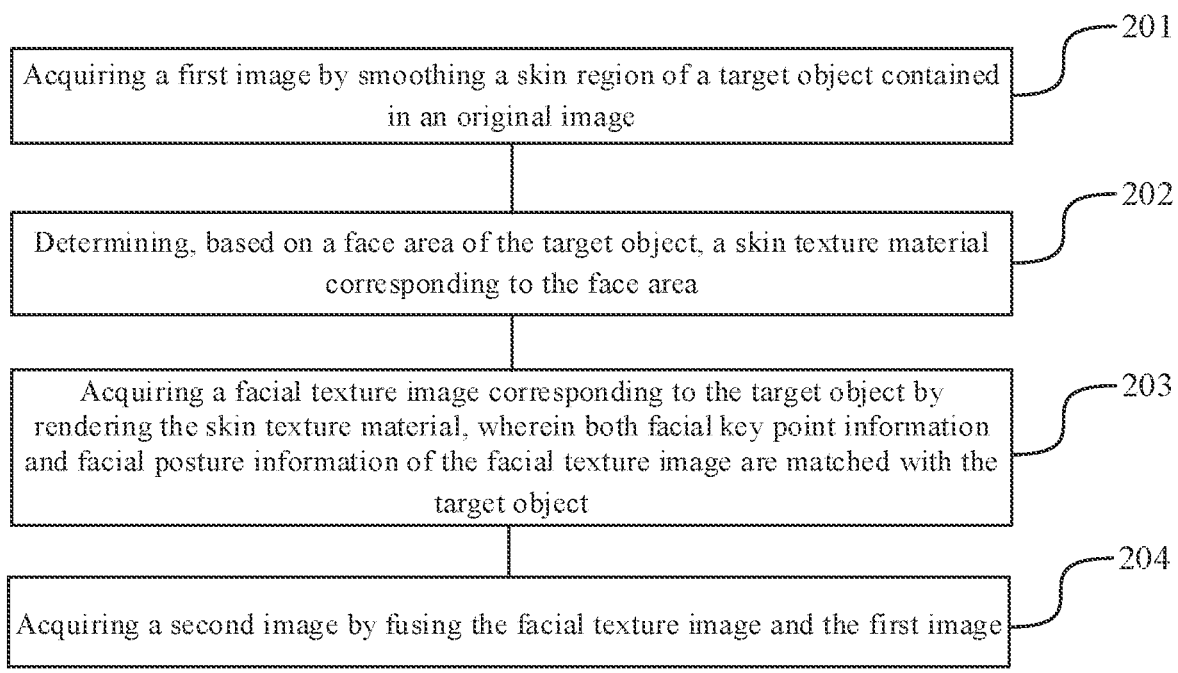
FIG. 2 is a flowchart of a method for processing images according to an embodiment.

FIG. 2 is a flowchart of a method for processing images according to an embodiment. Referring to FIG. 2, the method for processing images is executed by an electronic device.

In 201, a first image is acquired by smoothing a skin region of a target object contained in an original image. In other words, the first image is acquired by smoothing the skin region of the target object in the original image.

In 202, a skin texture material corresponding to a face area of the target object is determined based on the face area. In other words, the skin texture material matching with the face area of the target object is determined.

In 203, a facial texture image corresponding to the target object is acquired by rendering the skin texture material, wherein both facial key point information and facial posture information of the facial texture image are matched with the target object. The facial texture image corresponding to the target object is a facial texture image of the target object.

In 204, a second image is acquired by fusing the facial texture image with the first image.

In the method provided by the embodiment of the present disclosure, after smoothing the skin region of the target object in the original image, the skin texture material whose scale matches the face area is selected to generate the facial texture image that changes depending on a facial posture of the target object. The facial texture image is superimposed on the smoothed first image, such that the finally acquired second image has a better face skin grinding effect, and more facial texture details are restored, thereby improving the image processing accuracy and the image processing effect.

In some embodiments, determining the skin texture material matching with the face area of the target object includes: determining, based on a face area range within which the face area is, a resolution range matching with the face area range, wherein a median value of the face area range is positively correlated with a median value of the resolution range; and acquiring the skin texture material whose resolution is within the resolution range.

In some embodiments, acquiring the facial texture image matching with the target object by rendering the skin texture material includes: acquiring the facial key point information and the facial posture information of the target object, wherein the facial posture information is configured to indicate a face rotation condition of the target object; acquiring a target texture material by rendering the skin texture material based on the facial key point information and the facial posture information of the target object; and acquiring the facial texture image by fusing the target texture material with the original image.

In some embodiments, acquiring the target texture material by rendering the skin texture material based on the facial key point information and the facial posture information of the target object includes: acquiring standard key point information of the skin texture material; determining, based on the facial key point information and the standard key point information, a correspondence relationship between standard key points of the skin texture material and facial key points of the target object; and acquiring the target texture material by performing texture mapping on the skin texture material based on the correspondence relationship and the facial posture information.

In some embodiments, acquiring the first image by smoothing the skin region of the target object in the original image includes: acquiring facial key point information and facial posture information of the target object, wherein the facial posture information of the target object is configured to indicate a face rotation condition of the target object; acquiring a posture weight image of the target object based on the facial posture information of the target object, wherein the pixel value of each pixel in the posture weight image is configured to indicate a posture weight parameter of a corresponding pixel in the original image, the posture weight parameter being configured to indicate an importance of the corresponding pixel relative to the facial posture information; and acquiring the first image by smoothing the skin region based on the posture weight image.

In some embodiments, the facial posture information includes an Euler angle of the facial posture of the target object, and acquiring the posture weight image of the target object based on the facial posture information of the target object includes: acquiring a face orientation mask map of the target object based on a value symbol of the Euler angle of the facial posture, wherein the face orientation mask map is configured to indicate whether an orientation of a face of the target object is forward or backward; acquiring a distance from each pixel in a face region of the target object to a face midline; and acquiring the posture weight image based on the face orientation mask map and the distance.

In some embodiments, acquiring the posture weight image based on the face orientation mask map and the distance includes: acquiring a first value by multiplying the distance for each pixel in the face region of the target object by a pixel value of a corresponding pixel in the face orientation mask map; acquiring a second value by multiplying the first value by a first coefficient, wherein the first coefficient is an adjustment factor for a distance from a pixel to a face midline, and is greater than or equal to 0 and less than or equal to 1; and acquiring the pixel value of a corresponding pixel in the posture weight image by calculating a difference between a second coefficient and the second value, wherein the second coefficient is equal to 1.

In some embodiments, acquiring the first image by smoothing the skin region based on the posture weight image includes: acquiring a skin region image of the original image, wherein the skin region image is configured to indicate the skin region of the target object in the original image; acquiring a smoothed skin tone image and a smoothed posture weight image by smoothing the skin region image and the posture weight image based on a two-dimensional Gaussian blur function; and acquiring the first image by fusing the original image with the smoothed skin tone image and the smoothed posture weight image.

In some embodiments, the method further includes: acquiring a hair region image and an occluded face region image of the original image, and an average brightness parameter of the face region of the target object in the original image, wherein the hair region image is configured to indicate a hair region of the target object in the original image, and the occluded face region image is configured to indicate an occluded face region of the target object in the original image; and acquiring the second image by fusing the facial texture image with the first image includes: acquiring the second image based on the hair region image, the occluded face region image, the first image, the facial texture image, and the average brightness parameter.

In some embodiments, acquiring the second image based on the hair region image, the occluded face region image, the first image, the facial texture image, and the average brightness parameter includes: acquiring a third image by multiplying the pixel value of a pixel in the hair region image by the pixel values of pixels at corresponding positions in the occluded face region image, the first image, and the facial texture image; and acquiring the second image by multiplying the pixel value of each pixel in the third image by the average brightness parameter.

Figure 3:
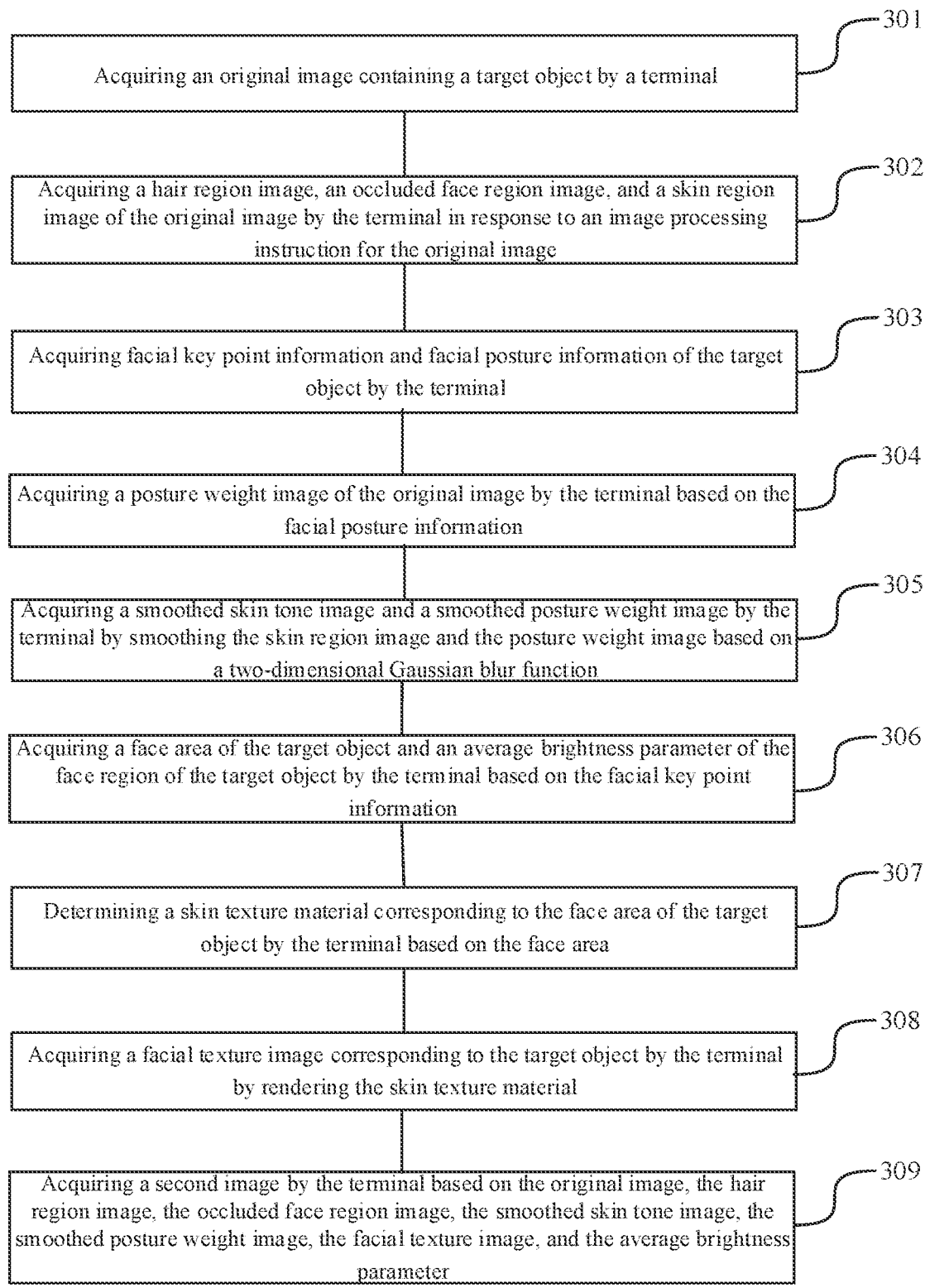
FIG. 3 is a flowchart of a method for processing images according to an embodiment.

FIG. 3 is a flowchart of a method for processing images according to an embodiment. Referring to FIG. 3, the method for processing images is executed by an electronic device, and the following is taken the electronic device as a terminal as an example for description.

In 301, a terminal acquires an original image containing a target object.

The terminal is any electronic device supporting image processing. An application used for processing images is installed on the terminal. For example, the application includes at least one of a retouching application, a photo-taking application, a short video application, a live-streaming application, or a social application.

In some embodiments, the original image is a portrait photo taken by a camera component invoked by the terminal. For example, a user triggers a shooting instruction in the application. In response to the shooting instruction, the operating system of the terminal invokes the camera component to acquire an original image. Alternatively, the original image is a face image read by the terminal from a local database or a face image loaded by the terminal from a cloud database, the acquiring manner of which is not specifically limited in the embodiments of the present disclosure.

In some embodiments, the original image is any frame of image in a video (that is, a video frame) stored in the local database of the terminal, or the original image is any frame of image in a video loaded by the terminal from the cloud database. Whether the original image is a video frame is not specifically limited in the embodiments of the present disclosure.

This embodiment of the present disclosure is described by using an example in which the target object is a character and the original image is a portrait. In some other embodiments, the target object includes an animal (for example, a cat or a dog), a cartoon character, a virtual character, a virtual object, or the like. The type of the target object is not specifically limited in the embodiments of the present disclosure.

In some embodiments, in the case that the user determines that the shooting or selection of the original image is completed, the user can trigger an image processing instruction, such that the terminal performs the following 302 in response to the image processing instruction. In some embodiments, the image processing instruction carries the original image. In some embodiments, the image processing instruction is triggered via a skin grinding functional option in the application. The triggering mode for the image processing instruction includes a tap operation, a double-tap operation, a long press operation, and a drag operation in a specified direction, which is not specifically limited in the embodiments of the present disclosure.

In some embodiments, in the case that the user starts a photo-taking application on the terminal and taps a photo-taking functional option, the terminal invokes the camera component to take an original image, displays the original image in the photo-taking application, and provides at least one beautifying functional option for the original image, such as a skin grinding functional option, a face-lift functional option, a makeup functional option, a filter functional option, a sticker functional option, and a magic emoticon functional option. In response to the user tapping the skin grinding functional option, the image processing instruction is triggered, and the following 302 is performed.

In 302, the terminal acquires a hair region image, an occluded face region image, and a skin region image of the original image in response to the image processing instruction for the original image.

The hair region image is configured to indicate the hair region of the target object in the original image.

In some embodiments, the hair region image is a digital matrix having the same size as the original image. Each element in the matrix represents the probability that a pixel at a corresponding position in the original image belongs to the hair region. In this case, the hair region image is also referred to as a hair probability image. Because the hair region image has the same size as the original image, for any element in the matrix, a pixel having same position coordinates as the element can be determined in the original image according to the position coordinates of the element. The pixel having the same coordinates as the element is the above-mentioned pixel at the corresponding position. In some embodiments, only the probability of binarization is used in the above digital matrix, accordingly, the hair region image is a binary image. For example, in the binary image, a pixel whose value is 1 belongs to the hair region, and a pixel whose value is 0 belongs to a non-hair region; or a pixel whose value is 1 belongs to a non-hair region, and a pixel whose value is 0 belongs to the hair region, which is not specifically limited in the embodiments of the present disclosure.

In some embodiments, the terminal extracts the hair region image using a deep neural network. For example, the terminal inputs the original image into the deep neural network, the original image is weighted via a plurality of hidden layers connected in series in the deep neural network, and the hair region image is output from a last hidden layer. The deep neural network (DNN) includes a visual geometry group network (VGGNet), a residual neural network (ResNet), or the like, the structure of which is not limited in the embodiments of the present disclosure.

The occluded face region image is configured to indicate an occluded face region of the target object in the original image.

In some embodiments, the occluded face region image is a digital matrix having the same size as the original image. Each element in the matrix represents the probability that a pixel at a corresponding position in the original image belongs to the face region and is occluded. In this case, the occluded face region image is also referred to as an occluded face probability image. Because the occluded face region image has the same size as the original image, for any element in the matrix, a pixel having same position coordinates as the element can be determined in the original image according to the position coordinates of the element. The pixel having the same coordinates as the element is the above-mentioned pixel at the corresponding position. In some embodiments, only the probability of binarization is used in the above digital matrix, accordingly, the occluded face region image is a binary image. For example, in the binary image, a pixel whose value is 1 belongs to the occluded face region, and a pixel whose value is 0 does not belong to the occluded face region; or a pixel whose value is 1 does not belong to the occluded face region, and a pixel whose value is 0 belongs to the occluded face region, which is not specifically limited in the embodiments of the present disclosure.

In some embodiments, the terminal extracts the occluded face region image using a deep neural network. For example, the terminal inputs the original image into the deep neural network, the original image is weighted via a plurality of hidden layers connected in series in the deep neural network, and the occluded face region image is output from a last hidden layer. The deep neural network (DNN) includes a VGGNet, a ResNet, or the like, the structure of which is not limited in the embodiments of the present disclosure.

The skin region image is configured to indicate the skin region of the target object in the original image.

In some embodiments, the skin region image is a digital matrix having the same size as the original image. Each element in the matrix represents the probability that a pixel at a corresponding position in the original image belongs to the skin region. In this case, the skin region image is also referred to as a skin tone probability image. Because the skin region image has the same size as the original image, for any element in the matrix, a pixel having same position coordinates as the element can be determined in the original image according to the position coordinates of the element. The pixel having the same coordinates as the element is the above-mentioned pixel at the corresponding position. In some embodiments, only the probability of binarization is used in the above digital matrix, accordingly, the skin region image is a binary image. For example, in the binary image, a pixel whose value is 1 belongs to the skin region, and a pixel whose value is 0 belongs to a non-skin region; or a pixel whose value is 1 belongs to a non-skin region, and a pixel whose value is 0 belongs to the skin region, which is not specifically limited in the embodiments of the present disclosure.

In some embodiments, the terminal extracts the skin region image using a deep neural network. For example, the terminal inputs the original image into the deep neural network, the original image is weighted via a plurality of hidden layers connected in series in the deep neural network, and the skin region image is output from a last hidden layer. The deep neural network (DNN) includes a VGGNet, a ResNet, or the like, the structure of which is not limited in the embodiments of the present disclosure.

In some embodiments, the above deep neural networks for extracting the hair region image, the occluded face region image, and the skin region image are an entire deep neural network or three different deep neural networks. In the case that the above deep neural networks are the entire deep neural network, in response to the original image being input, the entire deep neural network outputs the above three images: the hair region image, the occluded face region image, and the skin region image, such that the image processing process can be simplified. In the case that the above deep neural networks are three different deep neural networks, the three different deep neural networks are respectively configured to extract and acquire different region images independently, such that the pertinence for extracting and acquiring each region image can be strengthened. This is not specifically limited in the embodiments of the present disclosure.

In some embodiments, the above entire deep neural network is a semantic segmentation model. In response to the terminal inputting the original image into the semantic segmentation model, the semantic segmentation model performs semantic segmentation on the original image, identifies the hair region, the occluded face region, and the skin region in the original image, and outputs the corresponding hair region image, occluded face region image, and skin region image. In some embodiments, the semantic segmentation model includes a fully convolutional network (FCN), a U-shaped convolutional neural network (U-net), a semantic segmentation network (SegNet), a linkage network (LinkNet), or the like. The structure of the semantic segmentation model is not specifically limited in the embodiments of the present disclosure.

In 303, the terminal acquires facial key point information and facial posture information of the target object.

The facial key point information is configured to indicate three-dimensional spatial coordinates of each facial key point of the target object. In some embodiment, the number of the facial key points is any value greater than 0. For example, the number of the facial key points is 5, 68, 128, or the like. The number of the facial key points is not specifically limited in the embodiments of the present disclosure.

The facial posture information is configured to indicate a face rotation condition of the target object. In other words, the facial posture information is configured to describe angle information of a face orientation of the target object. In some embodiments, the facial posture information includes at least one of a rotation matrix, a rotation vector, a quaternion, or an Euler angle of the facial posture, which is not specifically limited in the embodiments of the present disclosure.

In some embodiments, the terminal acquires a facial key point image by detecting facial key points from the original image, and acquires three-dimensional spatial coordinates of each facial key point (namely, the facial key point information) by converting two-dimensional image coordinates of each facial key point in the facial key point image from a pixel coordinate system to a world coordinate system. Optionally, during the process of acquiring the above facial key point information, a rotation matrix of a facial posture is also obtained. Based on the rotation matrix, the Euler angle of the facial posture (namely, the facial posture information) can be acquired via conversion.

In the above process, acquiring the facial key point information and the facial posture information is equivalent to acquiring the spatial coordinate information of the face, and it is convenient to calculate the face area based on the facial key point information and generate a posture weight image based on the facial posture information, thereby facilitating the overall image processing process.

In some embodiments, the terminal may extract the facial key point information and the facial posture information using a deep neural network. For example, the terminal inputs the original image into the deep neural network, the original image is weighted via a plurality of hidden layers connected in series in the deep neural network, the facial key point image is output from a last hidden layer, and the facial key point information and the facial posture information are acquired by post-processing based on the facial key point image.

In some embodiments, the deep neural network includes a deep convolutional neural network (DCNN) model, a tasks-constrained deep convolutional network (TCDCN), a multi-task cascaded convolutional neural network (MTCNN), or the like, the structure of which is not limited in the embodiments of the present disclosure.

In some embodiments, the terminal detects facial key points by using a facial key point detection algorithm, such that the facial key point detection process can be simplified. For example, the facial key point detection algorithm includes active shape models (ASM), active appearance models (AAM), cascaded pose regression (CPR), and the like, and the type of the facial key point detection algorithm is not specifically limited in the embodiments of the present disclosure. After the two-dimensional image coordinates of each facial key point are detected based on the above facial key point detection algorithm, the three-dimensional spatial coordinates of each facial key point (namely, the facial key point information) can be acquired by converting the two-dimensional image coordinates from the pixel coordinate system to the world coordinate system. In addition, the Euler angle of the facial posture (namely, the facial posture information) can be acquired based on the rotation matrix of the facial posture.

In 304, the terminal acquires a posture weight image of the original image based on the facial posture information.

The pixel value of each pixel in the posture weight image is configured to indicate a posture weight parameter of a corresponding pixel in the original image. The posture weight parameter is configured to indicate the importance of the corresponding pixel relative to the facial posture information. It should be noted that the corresponding pixel means that for any pixel in the posture weight image, a pixel having same position coordinates as the pixel in the posture weight image can be determined in the original image according to the position coordinates of the pixel in the posture weight image, wherein the pixel having the same coordinates as the pixel in the posture weight image is the above-mentioned corresponding pixel.

In some embodiments, description is given by taking the facial posture information as an Euler angle of the facial posture of the target object as an example. The terminal acquires a face orientation mask map of the target object based on a value symbol of the Euler angle of the facial posture, wherein the face orientation mask map is configured to indicate whether an orientation of a face in the target object is forward or backward; acquire a distance from each pixel in the face region of the target object to a face midline; and acquire the posture weight image based on the face orientation mask map and the distance.

The Euler angle of the facial posture is referred to as Euler angle for short, and includes three angles, that is, pitch angle, yaw angle, and roll angle. The pitch angle indicates an angle by which a face rotates around an x-axis, and can be visually described as an angle of nodding a head; the yaw angle indicates an angle by which a face rotates around a y-axis, and can be visually described as an angle of shaking ahead; and the roll angle indicates an angle by which a face rotates around a z-axis, and can be visually described as an angle of tilting/swinging a head.

In some embodiments, only the yaw angle in the Euler angle of the facial posture is considered. The value of the yaw angle is an angle value with a symbol. Whether the value symbol is positive or negative indicates whether the face orientation of the target object is forward or backward. In some embodiments, the value of the yaw angle being positive indicates that the face orientation is forward, and the value being negative indicates that the face orientation is backward. In some embodiments, the value of the yaw angle being positive indicates that the face orientation is backward, and the value being negative indicates that the face orientation is forward, which is not specifically limited in the embodiments of the present disclosure.

Assuming that the value of the yaw angle being positive indicates that the face orientation is forward, and the value being negative indicates that the face orientation is backward, after the terminal acquires the yaw angle in the Euler angle of the facial posture, in the case that the yaw angle is greater than or equal to 0, it indicates that the value symbol of the yaw angle is "+" (that is, the value is positive) and that the face orientation of the target object is forward. In this case, the pixel value of each pixel in the face orientation mask map is set to 1. On the contrary, in the case that the yaw angle is less than 0, it indicates that the value symbol of the yaw angle is "−" (that is, the value is negative) and that the face orientation of the target object is backward. In this case, the pixel value of each pixel in the face orientation mask map is set to 0.

In some embodiments, during the process of acquiring the distance from each pixel to the face midline, the terminal determines a facial key point at a tip of a nose and a facial key point at a root of the nose (or a facial key point at a lower jaw) from all facial key points, and determine a straight line as the face midline based on the two facial key points. Further, for each pixel, a directional distance with a symbol is acquired by multiplying the distance (the distance from a point to a line) from each pixel to the face midline by the yaw angle.

In some embodiments, during the process of acquiring the posture weight image, the terminal weights the face orientation mask map with the above distance. In other words, for each pixel in the face region, a first value is acquired by multiplying the distance from the pixel to the face midline by the pixel value of a corresponding pixel in the face orientation mask map; a second value is acquired by multiplying the first value by a first coefficient β, wherein the first coefficient β is an adjustment factor for the distance from a pixel to the face midline, and is greater than or equal to 0 and less than or equal to 1; and the pixel value of a corresponding pixel in the posture weight image is acquired by calculating the difference between a second coefficient α and the second value, wherein the second coefficient α is equal to 1. It should be noted that the corresponding pixel means that because the face orientation mask map can indicate the face orientation of each pixel in the face region of the target object, for any pixel in the face region, a pixel configured to indicate the face orientation of the pixel in the face region can be determined in the face orientation mask map (that is, the corresponding pixel).

In the above process, the face orientation mask map is weighted based on the distance from each pixel to the face midline, such that the value of each pixel in the posture weight image contains richer information, that is, the value can indicate not only whether the face orientation is forward or backward, but also whether the pixel is close to the center of the face or close to an edge of the face. Therefore, the posture weight image has a higher expression capability. In some embodiments, the terminal skips the process of weighting the face orientation mask map, that is, the face orientation mask map is directly used as the posture weight image, such that the image processing process can be simplified.

For example, assuming that the face orientation mask map is represented as $m_{faceD}$, and the distance from each pixel to the face midline is represented as l, the posture weight image is represented as $P_f = α − β \cdot l \cdot m_{faceD}$ wherein the second coefficient α is equal to 1, and the first coefficient β is an adjustable empirical parameter.

In the above process, an example in which the facial posture information is the Euler angle of the facial posture of the target object is taken for describing a process of acquiring the posture weight image. In the case that the Euler angle of the facial posture is used as the facial posture information, the posture weight image can be acquired faster and more conveniently. In addition, considering the yaw angle in the Euler angle of the facial posture can simplify the image processing process and reduce the computing load of the terminal.

In some embodiments, the values of the three angles in the Euler angle of the facial posture can also be comprehensively considered by the terminal, such that different posture weight parameters can be set respectively for six different face orientations (forward, backward, leftward, rightward, upward, and downward), to further improve the image processing precision.

In some embodiments, in addition to the Euler angle of the facial posture, the facial posture information further includes a rotation matrix, a rotation vector, a quaternion, or the like, expression mode of which is not specifically limited in the embodiments of the present disclosure.

In 305, the terminal acquires a smoothed skin tone image and a smoothed posture weight image by smoothing the skin region image and the posture weight image based on a two-dimensional Gaussian blur function.

In some embodiments, the terminal smooths any pixel (x, y) in the skin region image or the posture weight image based on the two-dimensional Gaussian blur function. The expression of the two-dimensional Gaussian blur function $G_{(x,y)}$ is as follows:

$$G_{(x,y)} = \frac{1}{2\pi\sigma^2} e^{-(x^2+y^2)/2\sigma^2}$$

wherein σ represents a standard deviation of Gaussian distribution, x represents an abscissa of a pixel, y represents an ordinate of a pixel, e represents the base of the natural logarithm, and π represents PI.

In some embodiments, taking the skin region image as an example, Gaussian blurring is equivalent to transforming the skin region image by a convolution matrix composed of pixels whose distribution is not zero. The pixel value of each pixel in the smoothed skin tone image is the weighted average value of the values of surrounding adjacent pixels of a pixel at a corresponding position in the skin region image. During weighted averaging, the closer a pixel is to the pixel at the corresponding position, the greater the weight is, and the farther the pixel is away from the pixel at the corresponding position, the smaller the weight is. The way of Gaussian blurring for the posture weight image is similar to the way of Gaussian blurring for the skin region image, which is not repeated in detail herein.

In the above process, the terminal can achieve the feathering effect for the skin region image and the posture weight image via two-dimensional Gaussian blurring by smoothing the skin region image and the posture weight image, thereby achieving a smoother transition effect. Gaussian blurring has the advantages of high calculation efficiency, fast calculation speed, and the like.

In some embodiments, the terminal acquires the smoothed skin tone image and the smoothed posture weight image by smoothing the skin region image and the posture weight image using a neighborhood averaging method (average filtering method), an overrun pixel smoothing method, an edge-preserving filtering method, a median filtering method, a convolution method, or other smoothing methods, and the smoothing method is not specifically limited in the embodiments of the present disclosure.

In 306, the terminal acquires a face area of the target object and an average brightness parameter of the face region of the target object based on the facial key point information.

In some embodiments, the terminal may determine a face outline of the target object in the original image based on the facial key point information, and acquire an area surrounded by the face outline as the face area. Alternatively, the terminal may directly acquire an area, of the face skin region in the skin region indicated by the skin region image in the above 302, as the face area.

In some embodiments, after determining the face region in the original image, the terminal extracts the brightness value of each pixel in the face region, and acquires the average value of the brightness values of all the pixels as the average brightness parameter.

In 307, the terminal determines a skin texture material corresponding to the face area based on the face area of the target object.

The above 307 means that the terminal determines the skin texture material matching with the face area of the target object.

In some embodiments, the terminal pre-stores at least one candidate skin texture material, and randomly selects one of the pre-stored skin texture materials as the skin texture material matching with the face area, wherein these skin texture materials are texture materials for standard skin of the face of a character drawn by a technician. In this way, the acquisition process of the skin texture material can be simplified.

In some embodiments, the skin texture materials have different levels of resolutions (namely, scales). The terminal determines, based on a face area range within which the face area acquired in the above 306 is, a resolution range matching with the face area range, wherein the median of the face area range is positively correlated with the median of the resolution range; and acquire the skin texture material whose resolution is within the resolution range.

In the above process, it is equivalent to classifying, based on different resolution values, all the pre-stored skin texture materials into material sets corresponding to different resolution ranges. In addition, each resolution range matches with one face area range. It can be ensured that the greater the median of a resolution range, the greater the median of a matching face area range. In this case, the resolution range, matching with a face area range within which the face area of the target object is, can be determined based on the face area range, and then a skin texture material can be randomly selected from a material set of the resolution range. Therefore, the skin texture material whose resolution and size better match the face area can be selected based on different sizes of the face area of the target object, which makes a facial texture image sequentially acquired via rendering more natural and reduces the sense of inharmoniousness.

In some embodiments, the terminal determines a first skin texture material in response to the face area being greater than a first area threshold; determines a second skin texture material in response to the face area being less than or equal to the first area threshold and greater than a second area threshold, wherein the resolution of the second skin texture material is less than the resolution of the first skin texture material; and determines a third skin texture material in response to the face area being less than or equal to the second area threshold, wherein the resolution of the third skin texture material is less than the resolution of the second skin texture material.

Both the first area threshold and the second area threshold are values greater than 0, and the first area threshold is greater than the second area threshold.

In some embodiments, the skin texture materials are classified into three scales depending on different resolutions. The resolution of a skin texture material in a first scale is greater than a first resolution threshold, that is, a skin texture material matching with the first scale is referred to as the first skin texture material; the resolution of a skin texture material in a second scale is less than or equal to the first resolution threshold and is greater than a second resolution threshold, that is, a skin texture material matching with the second scale is referred to as the second skin texture material; and the resolution of a skin texture material in a third scale is less than or equal to the second resolution threshold, that is, a skin texture material matching with the third scale is referred to as the third skin texture material. Both the first resolution threshold and the second resolution threshold are values greater than 0, and the first resolution threshold is greater than the second resolution threshold.

In some embodiments, when selecting one of skin texture materials within a same scale, the terminal randomly selects one skin texture material from all skin texture materials within this scale; or the terminal acquires the attribute information of the target object, and selects the skin texture material matching with the attribute information from all the skin texture materials in this scale. Optionally, the attribute information may include, but is not limited to, gender, age, and race.

In some embodiments, taking that the attribute information is gender as an example, the gender of the target object may be extracted via a binary classification model, such as a logistic regression model, that is, the original image is input into the logistic regression model, and the probability that "the target object is male" is predicted via the logistic regression model. In the case that the probability output by the logistic regression model is greater than a predetermined threshold, it is determined that the gender of the target object is male; otherwise, in the case that the probability output by the model is less than or equal to the predetermined threshold, it is determined that the gender of the target object is female, wherein the predetermined threshold is any value great than or equal to 0 and less than or equal to 1. Similarly, all other attribute information such as age and race of the target object can be extracted via a binary classification model or a multi-class classification model. The acquiring method for the attribute information is not specifically limited in the embodiments of the present disclosure.

In some embodiments, taking that the attribute information is gender as an example, skin texture materials in each scale include a male skin texture material and a female skin texture material. After the matching resolution range (namely, resolution scale) is selected based on the face area range within which the face area of the target object is, the skin texture material is selected based on the attribute information of the target object. In the case that the attribute information of the target object is male, a male skin texture material is selected from skin texture materials in the matching resolution scale.

In some embodiments, assuming that the first area threshold is $T_1$, the second area threshold is $T_2$, the face area is $A_f$, and the terminal pre-stores three skin texture materials $S_1$, $S_2$, and $S_3$ with different scales, the terminal performs the following operations: in the case that $A_f > T_1$, the skin texture material $S_1$ with the greatest scale is selected; in the case that $T_1 \geq A_f > T_2$, the skin texture material $S_2$ with the moderate scale is selected; and in the case that $A_f \leq T_2$, the skin texture material $S_3$ with the smallest scale is selected.

In the above process, the skin texture materials are classified into different levels based on resolutions, and correspondences between the different levels and different face area ranges are established, such that faces with different sizes and resolutions of the target object can be targeted to select skin texture materials with different scales, and a facial texture image sequentially acquired via rendering can better fit the target object.

In 308, the terminal acquires a facial texture image corresponding to the target object by rendering the skin texture material.

The above 308 means that the terminal acquires the facial texture image of the target object by rendering the skin texture material.

Both facial key point information and facial posture information of the facial texture image are matched with the target object.

In some embodiments, the terminal acquires a target texture material by rendering the skin texture material based on the facial key point information and the facial posture information of the target object; and acquires the facial texture image by fusing the target texture material with the original image.

In the above process, the skin texture material is rendered based on the spatial coordinate information of the face, to acquire the rendered target texture material. Therefore, an original standard skin texture material can be changed into the target texture material that fits the facial features and posture of the target object, that is, the target texture material has better fitness. Further, skin texture materials of different scales are selected for face areas of different sizes to achieve hierarchical rendering, such that on the basis that the target texture material fits the facial features and posture of the target object, it can also be ensured that the target texture material better fits the size and resolution of the face of the target object. Therefore, the above target texture material is also referred to as "face follow-up texture image."

In some embodiments, when rendering the skin texture material, the terminal acquires standard key point information of the skin texture material; determine a correspondence relationship between standard key points of the skin texture material and facial key points of the target object based on the facial key point information and the standard key point information; and acquire the target texture material by performing texture UV mapping on the skin texture material based on the correspondence relationship and the facial posture information. The facial key point information is configured to indicate the facial key points of the target object, and the standard key point information is configured to indicate the standard key points of the skin texture material.

In the above process, because key points at a corresponding position of the face have a same index number in the facial key point information and the standard key point information, correspondences relationship between the standard key points of the skin texture material and the facial key points of the target object can be established based on index numbers. Further, UV mapping can be precisely performed on a skin texture material of a standard posture based on the correspondence relationship and the facial posture information configured to indicate a face rotation condition, thereby forming a target texture material that matches the facial key point information and the facial posture information of the target object. Therefore, the target texture material can be more natural, and can avoid the sense of discomfort and the feeling of inharmoniousness caused due to an unconformity between a facial texture direction of the target texture material and a posture or a facial key point of the target object.

In some embodiments, the terminal fuses the target texture material with the original image by performing fusion in a linear light superposition mode. For example, assuming that the original image is I, and the target texture material is $T_s$, the facial texture image $I_t$ is represented as $I_t = I + 2.0 \times T_s - 1.0$, such that the target texture material and the original image is better fused.

In some embodiments, besides the above-mentioned fusion in the linear light superposition mode, the terminal acquires the facial texture image by directly adding pixels in the target texture material with pixels at corresponding positions in the original image by element, such that computing resources of the terminal can be saved.

In 309, the terminal acquires a second image based on the original image, the hair region image, the occluded face region image, the smoothed skin tone image, the smoothed posture weight image, the facial texture image, and the average brightness parameter.

In some embodiments, the terminal expands the average brightness parameter acquired in the above 306 into a brightness image having the same size as the original image, the value of each pixel in the brightness image being the average brightness parameter; and acquire the second image by performing multiplication on the pixel values of pixels at corresponding positions in the above seven images having the same size, that is, the brightness image, the original image acquired in the above 301, the hair region image and the occluded face region image acquired in the above 302, the smoothed skin tone image and the smoothed posture weight image acquired in the above 305, and the facial texture image acquired in the above 308.

In some embodiments, without considering the hair region image, the occluded face region image, and the average brightness parameter, the terminal acquires the first image by fusing the original image, the smoothed skin tone image, and the smoothed posture weight image, and then acquires the second image by fusing the facial texture image with the first image, such that the image processing process can be simplified.

In some embodiments, a server fuses the original image, the smoothed skin tone image, and the smoothed posture weight image in the following way: acquiring the first image by multiplying a pixel value of a pixel in the original image by pixel values of pixels at corresponding positions in the smoothed skin tone image and the smoothed posture weight image by element.

In some embodiments, the server fuses the facial texture image with the first image in the following way: acquiring the second image by multiplying a pixel value of a pixel in the first image by a pixel value of a pixel at a corresponding position in the facial texture image by element.

The above process for acquiring the first image is a process of acquiring the first image by the terminal by smoothing the skin region based on the posture weight image. By introducing the posture weight image during acquiring the first image, the distance between each face pixel and the face midline and the orientation of each face pixel is considered during smoothing of the skin region, such that a better smoothing effect can be achieved.

In some embodiments, in addition to introducing a posture weighting mechanism by using the posture weight image, the terminal can also acquire, using another smoothing fashion, the first image by smoothing the skin region of the target object in the original image containing the target object. For example, the above smoothing method includes, but is not limited to, a neighborhood averaging method (average filtering method), an overrun pixel smoothing method, an edge-preserving filtering method, a median filtering method, and a convolution method, which is not specifically limited in the embodiments of the present disclosure.

In some embodiments, in the cast that the hair region image, the occluded face region image, and the average brightness parameter are considered, the above 308 is equivalent to acquiring the second image based on the hair region image, the occluded face region image, the first image, the facial texture image, and the average brightness parameter.

In some embodiments, the terminal performs the following processes: acquiring a third image by multiplying the pixel value of a pixel in the hair region image by the pixel values of pixels at corresponding positions in the occluded face region image, the first image, and the facial texture image; and acquiring the second image by multiplying the pixel value of each pixel in the third image by the average brightness parameter. Therefore, the above images can be fully fused without losing the important information of the average brightness parameter.

In the above process, factors such as the hair region image, the occluded face region image, and the average brightness parameter are introduced during acquiring of the second image, such that texture details are not added to the hair region and the occluded face region in the second image, that is, texture details are only added to a face skin region that is smoothed and not occluded. Therefore, a deformation occurred in the hair region or a deformation occurred in the occluded face region in the second image is avoided; and it is ensured that added texture details conform with the original average brightness parameter of the face, which can avoid inconsistency of skin tones in the second image.

Figure 4:
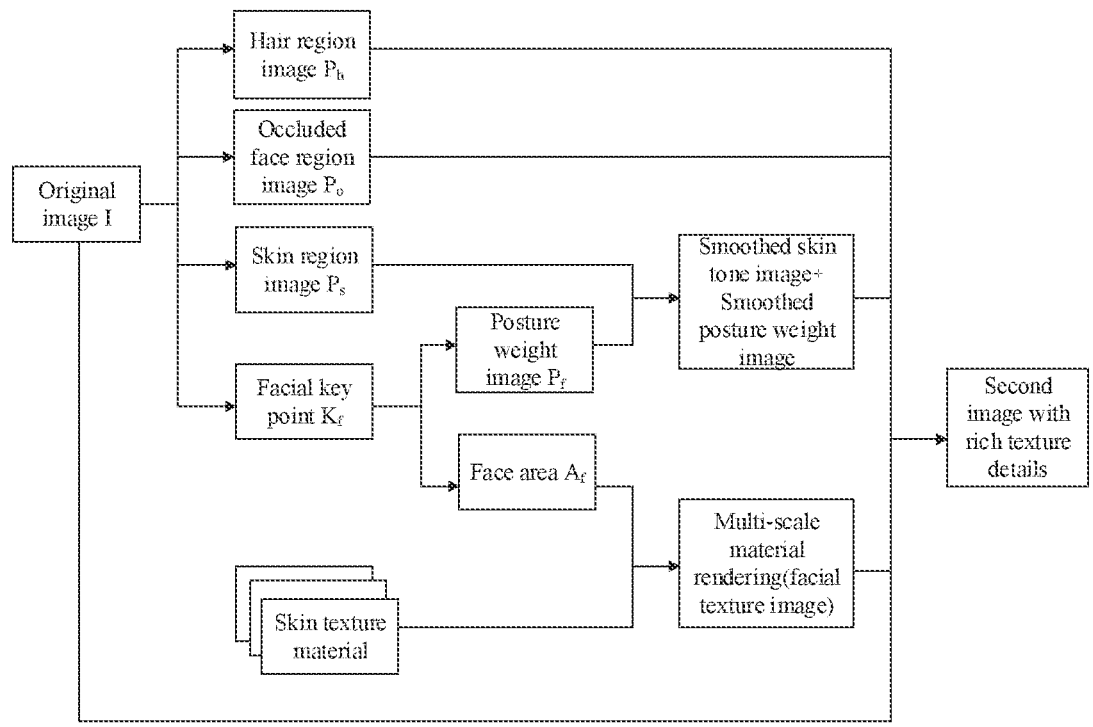
FIG. 4 is a flowchart describing a principle of a method for processing images according to an embodiment of the present disclosure.

FIG. 4 is a flowchart describing a principle of a method for processing images according to an embodiment of the present disclosure. Referring to FIG. 4, the original image I is input, and the following processes are performed: firstly, a hair region image $P_h$ is acquired via a trained deep neural network; secondly, an occluded face region image $P_o$ is acquired via a trained deep neural network; thirdly, a skin region image $P_s$ is acquired via a trained deep neural network; fourthly, spatial coordinate information of a face is acquired via a trained deep neural network, which includes facial key point information $K_f$ and facial posture information $K_{pose}$; fifthly, a face orientation mask map $m_{faceD}$ is acquired based on the facial posture information $K_{pose}$, the distance l between each pixel to a face midline is calculated, and a posture weight image $P_f$ is generated according to a formula $P_f = \alpha - \beta \cdot l \cdot m_{faceD}$; sixthly, a face area $A_f$ is calculated based on the facial key point information $K_f$, and an average brightness parameter $L_f$ of the face region is acquired; seventhly, a smoothed posture weight image and a smoothed skin tone image are acquired by feathering (namely, smoothing) the posture weight image $P_f$ and the skin region image $P_s$ via a two-dimensional Gaussian blur function; eighthly, a rendered target texture material $T_s$ is acquired via hierarchical rendering which means that different skin texture materials are selected depending on different face areas $A_f$; ninthly, a facial texture image $I_t$ is acquired by superimposing the target texture material $T_s$ onto the original image I in a linear light superposition mode, wherein $I_t = I + 2.0 \times T_s - 1.0$; and tenthly, a final facial texture superimposing result (namely, the second image) is acquired based on the images acquired in the above processes of first, second, six, seven, and nine, and the original image.

In the above process, after skin grinding is performed on the face skin, corresponding facial texture details can be added, via a pre-stored skin texture material, to an image whose texture is lost after the skin grinding. Therefore, after skin grinding and blemish removal, the face can still contain textures, which makes the skin grinding effect more natural and real, and avoids increasing image noise due to the USM sharpening algorithm. In some embodiments, a deep neural network is also used to automatically generate relatively real and natural skin textures in an end-to-end fashion. In addition, facial status under different postures and brightness is considered more properly by introducing the facial posture information and the average brightness parameter, such that the texture superimposing effect is more natural and unobtrusive. In addition, the face region can be divided more finely via the deep neural network, thereby ensuring that non-face regions are not affected.

In the method provided by the embodiment of the present disclosure, after smoothing the skin region of the target object in the original image, the skin texture material whose scale matches the face area is selected to generate the facial texture image that changes depending on a facial posture of the target object. The facial texture image is superimposed on the smoothed first image, such that the finally acquired second image has a better face skin grinding effect, and more facial texture details are restored, thereby improving the image processing accuracy and the image processing effect.

Figure 5:
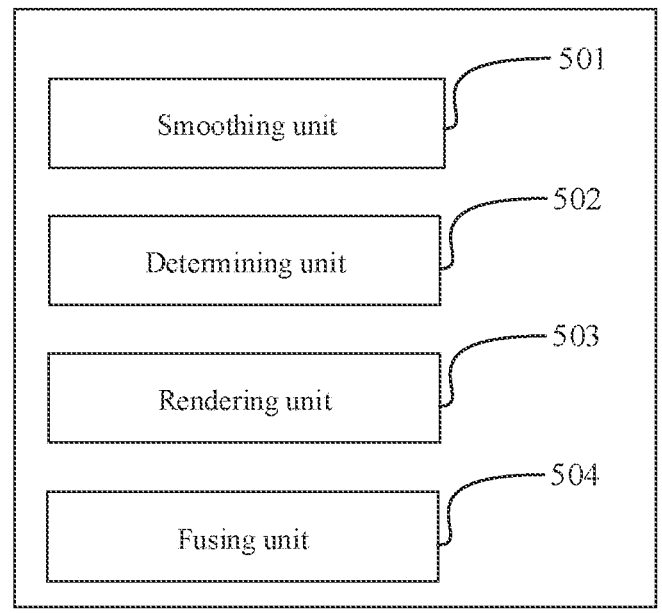
FIG. 5 is a logical structural block diagram of an apparatus for processing images according to an embodiment.

FIG. 5 is a logical structural block diagram of an apparatus for processing images according to an embodiment. Referring to FIG. 5, the apparatus includes a smoothing unit 501, a determining unit 502, a rendering unit 503, and a fusing unit 504.

The smoothing unit 501 is configured to acquire a first image by smoothing a skin region of a target object in an original image.

The determining unit 502 is configured to determine a skin texture material matching with a face area of the target object.

The rendering unit 503 is configured to acquire a facial texture image of the target object by rendering the skin texture material, wherein both facial key point information and facial posture information of the facial texture image are matched with the target object.

The fusing unit 504 is configured to acquire a second image by fusing the facial texture image with the first image.

In the apparatus provided by the embodiment of the present disclosure, after smoothing the skin region of the target object in the original image, the skin texture material whose scale matches the face area is selected to generate the facial texture image that changes depending on a facial posture of the target object. The facial texture image is superimposed on the smoothed first image, such that the finally acquired second image has a better face skin grinding effect, and more facial texture details are restored, thereby improving the image processing accuracy and the image processing effect.

In some embodiments, the determining unit 502 is configured to determine, based on a face area range within which the face area is, a resolution range matching with the face area range, wherein a median value of the face area range is positively correlated with a median value of the resolution range; and acquire the skin texture material whose resolution is within the resolution range.

In some embodiments, based on the composition of the apparatus shown in FIG. 5, the rendering unit 503 includes a first acquiring subunit, a rendering subunit, and a fusing subunit. The first acquiring subunit is configured to acquire the facial key point information and the facial posture information of the target object, wherein the facial posture information of the target object is configured to indicate a face rotation condition of the target object. The rendering subunit is configured to acquire a target texture material by rendering the skin texture material based on the facial key point information and the facial posture information of the target object. The fusing subunit is configured to acquire the facial texture image by fusing the target texture material with the original image.

In some embodiments, the rendering subunit is configured to acquire standard key point information of the skin texture material; determine, based on the facial key point information of the target object and the standard key point information, a correspondence relationship between standard key points of the skin texture material and facial key points of the target object; and acquire the target texture material by performing texture mapping on the skin texture material based on the correspondence relationship and the facial posture information.

In some embodiments, based on the composition of the apparatus shown in FIG. 5, the smoothing unit 501 includes a second acquiring subunit, a third acquiring subunit, and a smoothing subunit. The second acquiring subunit is configured to acquire the facial key point information and the facial posture information of the target object, wherein the facial posture information of the target object is configured to indicate a face rotation condition of the target object. The third acquiring subunit is configured to acquire a posture weight image of the target object based on the facial posture information of the target object, wherein the pixel value of each pixel in the posture weight image is configured to indicate a posture weight parameter of a corresponding pixel in the original image, the posture weight parameter being configured to indicate an importance of the corresponding pixel relative to the facial posture information. The smoothing subunit is configured to acquire the first image by smoothing the skin region based on the posture weight image.

In some embodiments, the facial posture information includes an Euler angle of the facial posture of the target object, and the third acquiring subunit includes a first acquiring sub-subunit, a second acquiring sub-subunit, and a third acquiring sub-subunit. The first acquiring sub-subunit is configured to acquire a face orientation mask map of the target object based on a value symbol of the Euler angle of the facial posture, wherein the face orientation mask map is configured to indicate whether an orientation of a face of the target object is forward or backward. The second acquiring sub-subunit is configured to acquire a distance from each pixel in a face region of the target object to a face midline. The third acquiring sub-subunit is configured to acquire the posture weight image based on the face orientation mask map and the distance.

In a possible embodiment, the third acquiring sub-subunit is configured to acquire a first value by multiplying the distance for each pixel in the face region of the target object by a pixel value of a corresponding pixel in the face orientation mask map; acquire a second value by multiplying the first value by a first coefficient, wherein the first coefficient is an adjustment factor for a distance from a pixel to a face midline, and is greater than or equal to 0 and less than or equal to 1; and acquire the pixel value of a corresponding pixel in the posture weight image by calculating a difference between a second coefficient and the second value, wherein the second coefficient is equal to 1.

In some embodiments, the smoothing subunit is configured to acquire a skin region image of the original image, wherein the skin region image is configured to indicate the skin region of the target object in the original image; acquire a smoothed skin tone image and a smoothed posture weight image by smoothing the skin region image and the posture weight image based on a two-dimensional Gaussian blur function; and acquire the first image by fusing the original image with the smoothed skin tone image and the smoothed posture weight image.

In some embodiments, based on the composition of the apparatus shown in FIG. 5, the apparatus further includes an acquiring unit. The acquiring unit is configured to a hair region image and an occluded face region image of the original image, and an average brightness parameter of the face region of the target object in the original image, wherein the hair region image is configured to indicate a hair region of the target object in the original image, and the occluded face region image is configured to indicate an occluded face region of the target object in the original image. The fusing unit 504 includes a fourth acquiring subunit. The fourth acquiring subunit is configured to acquire the second image based on the hair region image, the occluded face region image, the first image, the facial texture image, and the average brightness parameter.

In some embodiments, the fourth acquiring subunit is configured to acquire a third image by multiplying the pixel value of a pixel in the hair region image by the pixel values of pixels at corresponding positions in the occluded face region image, the first image, and the facial texture image; and acquire the second image by multiplying the pixel value of each pixel in the third image by the average brightness parameter.

Figure 6:
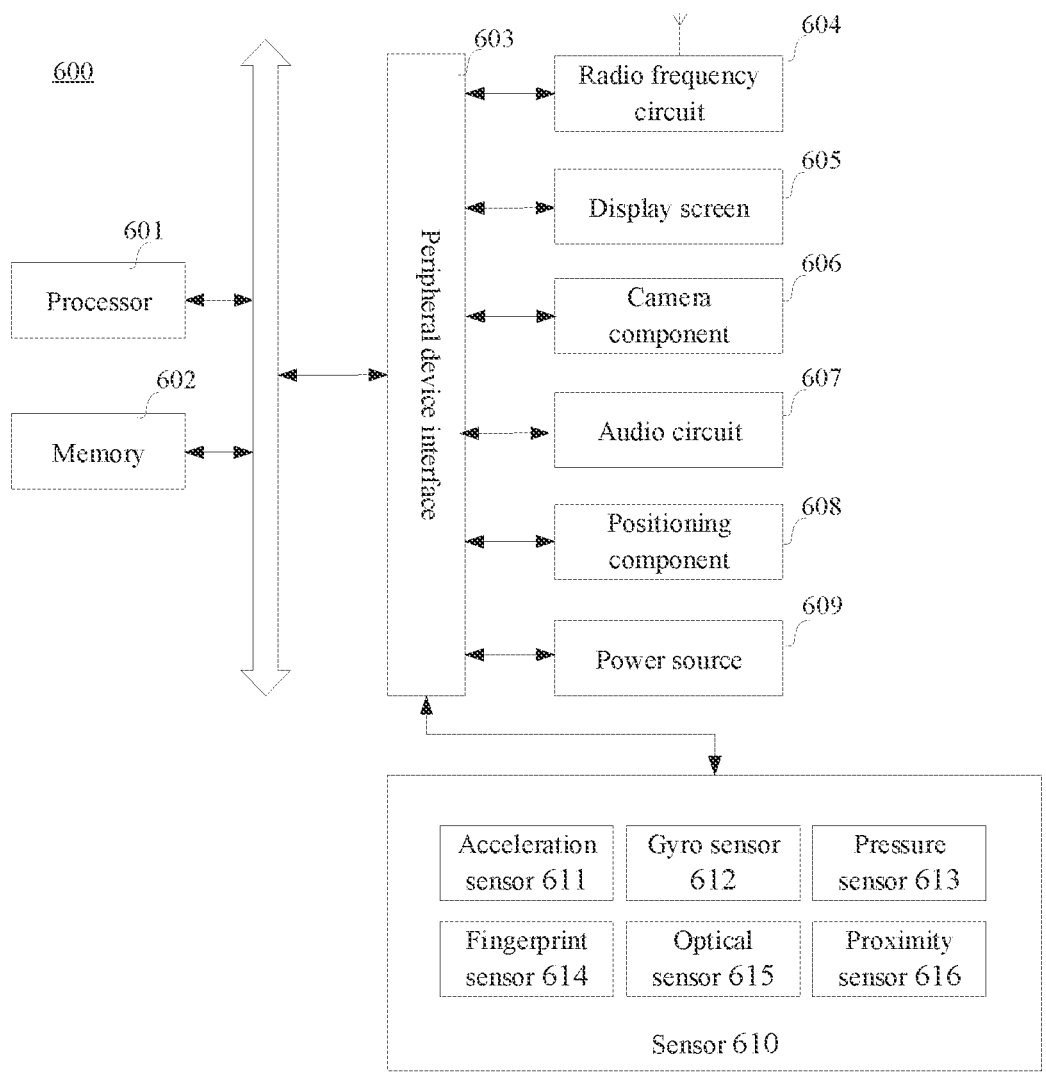
FIG. 6 is a structural block diagram of a terminal according to an embodiment of the present disclosure.

Taking that an electronic device is a terminal as an example for description, FIG. 6 is a structural block diagram of a terminal according to an embodiment of the present disclosure. The terminal 600 may be a smart phone, a tablet computer, a Moving Picture Experts Group Audio Layer III (MP3) player, a Moving Picture Experts Group Audio Layer IV (MP4) player, a laptop, or a desktop computer. The terminal 600 may also be called user equipment (UE), a portable terminal, a laptop terminal, a desktop terminal, or the like.

Usually, the terminal 600 includes one or more processors 601 and one or more memories 602.

The processor 601 may include one or more processing cores, such as a 4-core processor or an 8-core processor. The processor 601 may be implemented by at least one hardware of a digital signal processing (DSP), a field-programmable gate array (FPGA), and a programmable logic array (PLA). The processor 601 may also include a main processor and a coprocessor. The main processor is a processor configured to process the data in an awake state, and is also called a central processing unit (CPU). The coprocessor is a low-power-consumption processor configured to process the data in a standby state. In some embodiments, the processor 601 may be integrated with a graphics processing unit (GPU), which is configured to render and draw the content that needs to be displayed by a display screen. In some embodiments, the processor 601 may also include an artificial intelligence (AI) processor configured to process computational operations related to machine learning.

The memory 602 may include one or more computer-readable storage mediums, which may be non-transitory. The memory 602 may also include a high-speed random access memory, as well as a non-volatile memory, such as one or more magnetic disk storage devices and flash storage devices. In some embodiments, the non-transitory computer-readable storage medium in the memory 602 is configured to store one or more instructions therein, wherein the one or more instructions, when loaded and executed by the processor 601, cause the processor to perform the method for processing images as defined in the embodiments of the present disclosure.

In some embodiments, the terminal 600 may also include a peripheral device interface 603 and at least one peripheral device. The processor 601, the memory 602, and the peripheral device interface 603 may be connected via a bus or a signal line. Each peripheral device may be connected to the peripheral device interface 603 via a bus, a signal line, or a circuit board. Specifically, the peripheral device includes at least one of a radio frequency circuit 604, a touch display screen 605, a camera component 606, an audio circuit 607, a positioning component 608, and a power source 609.

The peripheral device interface 603 may be configured to connect at least one peripheral device associated with an input/output (I/O) to the processor 601 and the memory 602. In some embodiments, the processor 601, the memory 602, and the peripheral device interface 603 are integrated on the same chip or circuit board. In some other embodiments, any one or two of the processor 601, the memory 602, and the peripheral device interface 603 may be implemented on a separate chip or circuit board, which is not limited in the present disclosure.

The radio frequency circuit 604 is configured to receive and transmit a radio frequency (RF) signal, which is also referred to as an electromagnetic signal. The radio frequency circuit 604 communicates with a communication network and other communication devices via the electromagnetic signal. The radio frequency circuit 604 converts the electrical signal into the electromagnetic signal for transmission or converts the received electromagnetic signal into the electrical signal. Optionally, the radio frequency circuit 604 includes an antenna system, an RF transceiver, one or more amplifiers, a tuner, an oscillator, a digital signal processor, a codec chipset, a subscriber identity module card, and the like. The radio frequency circuit 604 may communicate with other terminals via at least one wireless communication protocol. The wireless communication protocol includes, but is not limited to, a metropolitan area network, various generations of mobile communication networks (2G, 3G, 4G, and 5G), a wireless local area network, and/or a wireless fidelity (Wi-Fi) network. In some embodiments, the radio frequency circuit 604 may also include near field communication (NFC) related circuits, which is not limited in the present disclosure.

The display screen 605 is configured to display a user interface (UI). The UI may include graphics, text, icons, videos, and any combination thereof. In the case that the display screen 605 is a touch display screen, the display screen 605 also can acquire touch signals on or over the surface of the display screen 605. The touch signal may be input into the processor 601 as a control signal for processing. In this case, the display screen 605 may also be configured to provide virtual buttons and/or virtual keyboards, which are also referred to as soft buttons and/or soft keyboards. In some embodiments, one display screen 605 may be disposed on the front panel of the terminal 600. In some other embodiments, at least two display screens 605 may be disposed respectively on different surfaces of the terminal 600 or in a folded design. In some embodiments, the display screen 605 may be a flexible display screen disposed on a bending or a folded surface of the terminal 600. Moreover, the display screen 605 may be defined to an irregular shape other than a rectangle, that is, the display screen 605 may be an irregular-shaped screen. The display screen 605 may be a light crystal display (LCD) screen, an organic light-emitting diode (OLED) display screen, or the like.

The camera component 606 is configured to capture images or videos. Optionally, the camera component 606 includes a front camera and a rear camera. Usually, the front camera is disposed on the front panel of the terminal, and the rear camera is disposed on the back surface of the terminal. In some embodiments, at least two rear cameras are disposed, and each of the at least two rear cameras is at least one of a main camera, a depth-of-field camera, a wide-angle camera, and a telephoto camera, to achieve a background blurring function achieved by fusion of the main camera and the depth-of-field camera, panoramic shooting and virtual reality (VR) shooting functions by fusion of the main camera and the wide-angle camera, or other fusion shooting functions. In some embodiments, the camera component 606 may further include a flashlight. The flashlight may be a mono-color-temperature flashlight or a two-color-temperature flashlight. The two-color-temperature flashlight is a combination of a warm flashlight and a cold flashlight and may be used for light compensation at different color temperatures.

The audio circuit 607 may include a microphone and a speaker. The microphone is configured to acquire sound waves of users and environments, and convert the sound waves into electrical signals which are input into the processor 601 for processing, or input into the radio frequency circuit 604 for voice communication. For stereo acquisition or noise reduction, there may be a plurality of microphones respectively disposed at different positions of the terminal 600. The microphone may also be an array microphone or an omnidirectional acquisition microphone. The speaker is then configured to convert the electrical signals from the processor 601 or the radio frequency circuit 604 into the sound waves. The speaker may be a conventional film speaker or a piezoelectric ceramic speaker. In the case that the speaker is the piezoelectric ceramic speaker, the electrical signal may be converted into not only human-audible sound waves but also the sound waves which are inaudible to humans for ranging and the like. In some embodiments, the audio circuit 607 may also include a headphone jack.

The positioning component 608 is configured to position the current geographic location of the terminal 600 to implement navigation or a location-based service (LBS). The positioning component 608 may be United States' Global Positioning System (GPS), China's BeiDou Navigation Satellite System (BDS), Russia's Global Navigation Satellite System (GLONASS), or the European Union's Galileo Satellite Navigation System (Galileo).

The power source 609 is configured to power up various components in the terminal 600. The power source 609 may be alternating current, direct current, a disposable battery, or a rechargeable battery. In the case that the power source 609 includes the rechargeable battery, the rechargeable battery may support wired or wireless charging. The rechargeable battery may also support the fast charging technology.

In some embodiments, the terminal 600 also includes one or more sensors 610. The one or more sensors 610 include, but are not limited to, an acceleration sensor 611, a gyro sensor 612, a pressure sensor 613, a fingerprint sensor 614, an optical sensor 615, and a proximity sensor 616.

The acceleration sensor 611 may detect magnitudes of accelerations on three coordinate axes of a coordinate system established by the terminal 600. For example, the acceleration sensor 611 may be configured to detect components of a gravitational acceleration on the three coordinate axes. The processor 601 may control the touch display screen 605 to display a user interface in a transverse view or a longitudinal view based on a gravity acceleration signal acquired by the acceleration sensor 611. The acceleration sensor 611 may also be configured to acquire motion data of a game or a user.

The gyro sensor 612 can detect a body direction and a rotation angle of the terminal 600, and can cooperate with the acceleration sensor 611 to acquire a 3D motion of the user to the terminal 600. Based on the data acquired by the gyro sensor 612, the processor 601 can achieve the following functions: motion sensing (such as changing the UI according to a user's tilt operation), image stabilization during shooting, game control, and inertial navigation.

The pressure sensor 613 may be disposed on a side frame of the terminal 600 and/or a lower layer of the touch display screen 605. In the case that the pressure sensor 613 is disposed on the side frame of the terminal 600, a user's holding signal to the terminal 600 can be detected. The processor 601 can perform left-right hand recognition or quick operation according to the holding signal acquired by the pressure sensor 613. In the case that the pressure sensor 613 is disposed on the lower layer of the touch display screen 605, the processor 601 controls an operable control on the UI according to a user's press operation on the touch display screen 605. The operable control includes at least one of a button control, a scroll bar control, an icon control, and a menu control.

The fingerprint sensor 614 is configured to acquire a user's fingerprint. The processor 601 identifies the user's identity based on the fingerprint acquired by the fingerprint sensor 614, or the fingerprint sensor 614 identifies the user's identity based on the acquired fingerprint. In the case that the user's identity is identified as trusted, the processor 601 authorizes the user to perform related sensitive operations, such as unlocking the screen, viewing encrypted information, downloading software, paying, and changing settings. The fingerprint sensor 614 may be disposed on the front, the back, or the side of the terminal 600. In the case that the terminal 600 is provided with a physical button or a manufacturer's logo, the fingerprint sensor 614 may be integrated with the physical button or the manufacturer's logo.

The optical sensor 615 is configured to acquire ambient light intensity. In one embodiment, the processor 601 may control the display brightness of the touch display screen 605 based on the ambient light intensity acquired by the optical sensor 615. In some embodiments, in the case that the ambient light intensity is high, the display brightness of the touch display screen 605 is increased; and in the case that the ambient light intensity is low, the display brightness of the touch display screen 605 is decreased. In some embodiments, the processor 601 may also dynamically adjust shooting parameters of the camera component 606 according to the ambient light intensity acquired by the optical sensor 615.

The proximity sensor 616, also referred to as a distance sensor, is usually disposed on the front panel of the terminal 600. The proximity sensor 616 is configured to acquire a distance between the user and the front surface of the terminal 600. In some embodiments, in the case that the proximity sensor 616 detects that the distance between the user and the front surface of the terminal 600 gradually decreases, the processor 601 controls the touch display screen 605 to switch from a screen-on state to a screen-off state. In the case that the proximity sensor 616 detects that the distance between the user and the front surface of the terminal 600 gradually increases, the processor 601 controls the touch display screen 605 to switch from the screen-off state to the screen-on state.

Those skilled in the art may understand that the structure shown in FIG. 6 does not constitute a limitation to the terminal 600. The terminal 600 may include more or fewer components than those shown in the figure, or combine some components or adopt different component arrangements.

Figure 7:
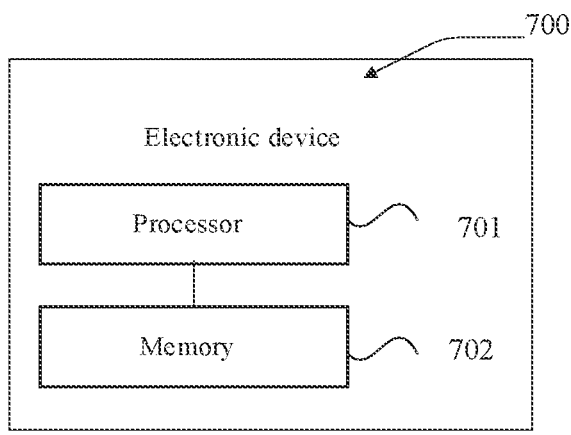
FIG. 7 is a schematic structural diagram of an electronic device according to an embodiment of the present disclosure.

FIG. 7 is a schematic structural diagram of an electronic device according to an embodiment of the present disclosure. Significant differences may be formed depending on different configurations or performances of the electronic device 700. The electronic device 700 may include one or more processors (CPUs) 701 and one or more memories 702. The one or more memories 702 are configured to store one or more instructions. The one or more instructions, when loaded and executed by the one or more processors 701, cause the one or more processors to perform the method for processing images provided by the above embodiments. Of course, the electronic device 700 may further include components such as a wired or wireless network interface, a keyboard, and an input/output interface for input and output. The electronic device 700 may further include other components for implementing device functions, which is not repeated herein.

In some embodiments, a storage medium is provided. The storage medium stores one or more instructions, such as a memory storing one or more instructions. The one or more instructions, when loaded and executed by the processor in the electronic device, cause the electronic device to perform the method for processing images provided by the above embodiments. Optionally, the above storage medium may be a non-temporary computer-readable storage medium. For example, the non-temporary computer-readable storage medium may include a read-only memory (ROM), a random-access memory (RAM), a compact disc read-only memory (CD-ROM), a magnetic tape, a floppy disc, an optical data storage device, or the like.

In some embodiments, a computer program product is provided. The computer program product stores one or more instructions therein. The one or more instructions, when loaded and executed by the processor in the electronic device, cause the electronic device to perform the method for processing images provided by the above embodiments.

What is claimed is:

1. A method for processing images, comprising:
acquiring a first image by smoothing a skin region of a target object in an original image;
determining a skin texture material matching with a face area of the target object, wherein the skin texture material is selected from pre-stored candidate skin texture materials, wherein the pre-stored candidate skin materials are texture materials for standard skin of a face of a character drawn by a technician;
acquiring a facial texture image of the target object by rendering the skin texture material, wherein both facial key point information and facial posture information of the facial texture image are matched with the target object; and
acquiring a second image by fusing the facial texture image with the first image.

2. The method according to claim 1, wherein said determining the skin texture material matching with the face area of the target object comprises:
determining, based on a face area range within which the face area is, a resolution range matching with the face area range, wherein a median value of the face area range is positively correlated with a median value of the resolution range; and acquiring the skin texture material whose resolution is within the resolution range.

3. The method according to claim 1, wherein said acquiring the facial texture image of the target object by rendering the skin texture material comprises:

acquiring facial key point information and facial posture information of the target object, wherein the facial posture information of the target object is configured to indicate a face rotation condition of the target object;

acquiring a target texture material by rendering the skin texture material based on the facial key point information and the facial posture information of the target object; and acquiring the facial texture image by fusing the target texture material with the original image.

4. The method according to claim 3, wherein said acquiring the target texture material by rendering the skin texture material based on the facial key point information and the facial posture information of the target object comprises:

acquiring standard key point information of the skin texture material;

determining, based on the facial key point information of the target object and the standard key point information, a correspondence relationship between standard key points of the skin texture material and facial key points of the target object; and acquiring the target texture material by performing texture mapping on the skin texture material based on the correspondence relationship and the facial posture information of the target object.

5. The method according to claim 1, wherein said acquiring the first image by smoothing the skin region of the target object in the original image comprises:

acquiring facial key point information and facial posture information of the target object, wherein the facial posture information of the target object is configured to indicate a face rotation condition of the target object;

acquiring a posture weight image of the target object based on the facial posture information of the target object, wherein a pixel value of each pixel in the posture weight image is configured to indicate a posture weight parameter of a corresponding pixel in the original image, the posture weight parameter being configured to indicate an importance of the corresponding pixel relative to the facial posture information; and acquiring the first image by smoothing the skin region based on the posture weight image.

6. The method according to claim 5, wherein the facial posture information of the target object comprises an Euler angle of a facial posture of the target object, and said acquiring the posture weight image of the target object based on the facial posture information of the target object comprises:

acquiring a face orientation mask map of the target object based on a value symbol of the Euler angle of the facial posture, wherein the face orientation mask map is configured to indicate whether an orientation of a face of the target object is forward or backward;

acquiring a distance from each pixel in a face region of the target object to a face midline; and acquiring the posture weight image based on the face orientation mask map and the distance.

7. The method according to claim 6, wherein said acquiring the posture weight image based on the face orientation mask map and the distance comprises:

acquiring a first value by multiplying the distance for each pixel in the face region of the target object by a pixel value of a corresponding pixel in the face orientation mask map;

acquiring a second value by multiplying the first value by a first coefficient, wherein the first coefficient is an adjustment factor for a distance from a pixel to a face midline, and is greater than or equal to 0 and less than or equal to 1; and acquiring a pixel value of a corresponding pixel in the posture weight image by calculating a difference between a second coefficient and the second value, wherein the second coefficient is equal to 1.

8. The method according to claim 5, wherein said acquiring the first image by smoothing the skin region based on the posture weight image comprises:

acquiring a skin region image of the original image, wherein the skin region image is configured to indicate the skin region of the target object in the original image;

acquiring a smoothed skin tone image and a smoothed posture weight image by smoothing the skin region image and the posture weight image based on a two-dimensional Gaussian blur function; and acquiring the first image by fusing the original image, the smoothed skin tone image, and the smoothed posture weight image.

9. The method according to claim 1, further comprising:

acquiring a hair region image and an occluded face region image of the original image, and an average brightness parameter of a face region of the target object in the original image, wherein the hair region image is configured to indicate a hair region of the target object in the original image, and the occluded face region image is configured to indicate an occluded face region of the target object in the original image; and acquiring the second image by fusing the facial texture image with the first image comprises:

acquiring the second image based on the hair region image, the occluded face region image, the first image, the facial texture image, and the average brightness parameter.

10. The method according to claim 9, wherein said acquiring the second image based on the hair region image, the occluded face region image, the first image, the facial texture image, and the average brightness parameter comprises:

acquiring a third image by multiplying a pixel value of a pixel in the hair region image by pixel values of pixels at corresponding positions in the occluded face region image, the first image, and the facial texture image; and acquiring the second image by multiplying a pixel value of each pixel in the third image by the average brightness parameter.

11. An electronic device, comprising:

one or more processors; and one or more memories configured to store one or more instructions executable by the one or more processors;

wherein the one or more processors, when loading and executing the one or more instructions, are caused to perform the following processes:

acquiring a first image by smoothing a skin region of a target object in an original image;

determining a skin texture material matching with a face area of the target object;

acquiring a facial texture image of the target object by rendering the skin texture material, wherein both facial key point information and facial posture information of the facial texture image are matched with the target object; and acquiring a second image by fusing the facial texture image with the first image, wherein said acquiring the first image by smoothing the skin region of the target object in the original image comprises:

acquiring facial key point information and facial posture information of the target object, wherein the facial posture information of the target object is configured to indicate a face rotation condition of the target object;

acquiring a posture weight image of the target object based on the facial posture information of the target object, wherein a pixel value of each pixel in the posture weight image is configured to indicate a posture weight parameter of a corresponding pixel in the original image, the posture weight parameter being configured to indicate an importance of the corresponding pixel relative to the facial posture information; and acquiring the first image by smoothing the skin region based on the posture weight image.

12. The electronic device according to claim 11, wherein the one or more processors, when loading and executing the one or more instructions, are caused to further perform the following processes:

determining, based on a face area range within which the face area is, a resolution range matching with the face area range, wherein a median value of the face area range is positively correlated with a median value of the resolution range; and acquiring the skin texture material whose resolution is within the resolution range.

13. The electronic device according to claim 11, wherein the one or more processors, when loading and executing the one or more instructions, are caused to further perform the following processes:

acquiring facial key point information and facial posture information of the target object, wherein the facial posture information of the target object is configured to indicate a face rotation condition of the target object;

acquiring a target texture material by rendering the skin texture material based on the facial key point information and the facial posture information of the target object; and acquiring the facial texture image by fusing the target texture material with the original image.

14. The electronic device according to claim 13, wherein the one or more processors, when loading and executing the one or more instructions, are caused to further perform the following processes:

acquiring standard key point information of the skin texture material;

determining, based on the facial key point information of the target object and the standard key point information, a correspondence relationship between standard key points of the skin texture material and facial key points of the target object; and acquiring the target texture material by performing texture mapping on the skin texture material based on the correspondence relationship and the facial posture information of the target object.

15. The electronic device according to claim 11, wherein the one or more processors, when loading and executing the one or more instructions, are caused to further perform the following processes:

acquiring a face orientation mask map of the target object based on a value symbol of an Euler angle of a facial posture, wherein the face orientation mask map is configured to indicate whether an orientation of a face of the target object is forward or backward;

acquiring a distance from each pixel in a face region of the target object to a face midline; and acquiring the posture weight image based on the face orientation mask map and the distance.

16. The electronic device according to claim 15, wherein the one or more processors, when loading and executing the one or more instructions, are caused to further perform the following processes:

acquiring a first value by multiplying the distance for each pixel in the face region of the target object by a pixel value of a corresponding pixel in the face orientation mask map;

acquiring a second value by multiplying the first value by a first coefficient, wherein the first coefficient is an adjustment factor for a distance from a pixel to a face midline, and is greater than or equal to 0 and less than or equal to 1; and acquiring a pixel value of a corresponding pixel in the posture weight image by calculating a difference between a second coefficient and the second value, wherein the second coefficient is equal to 1.

17. The electronic device according to claim 11, wherein the one or more processors, when loading and executing the one or more instructions, are caused to further perform the following processes:

acquiring a skin region image of the original image, wherein the skin region image is configured to indicate the skin region of the target object in the original image;

acquiring a smoothed skin tone image and a smoothed posture weight image by smoothing the skin region image and the posture weight image based on a two-dimensional Gaussian blur function; and acquiring the first image by fusing the original image, the smoothed skin tone image, and the smoothed posture weight image.

18. The electronic device according to claim 11, wherein the one or more processors, when loading and executing the one or more instructions, are caused to further perform the following processes:

acquiring a hair region image and an occluded face region image of the original image, and an average brightness parameter of a face region of the target object in the original image, wherein the hair region image is configured to indicate a hair region of the target object in the original image, and the occluded face region image is configured to indicate an occluded face region of the target object in the original image; and acquiring the second image based on the hair region image, the occluded face region image, the first image, the facial texture image, and the average brightness parameter.

19. A non-transitory computer-readable storage medium storing one or more instructions therein, wherein the one or more instructions, when loaded and executed by one or more processors of an electronic device, cause the electronic device to perform the following processes:

acquiring a first image by smoothing a skin region of a target object in an original image;

determining a skin texture material matching with a face area of the target object, wherein the skin texture material is selected from pre-stored candidate skin texture materials, wherein the pre-stored candidate skin materials are texture materials for standard skin of a face of a character drawn by a technician;

acquiring a facial texture image of the target object by rendering the skin texture material, wherein both facial key point information and facial posture information of the facial texture image are matched with the target object; and acquiring a second image by fusing the facial texture image with the first image.

* * * * *